United States Patent [19]

Shoens et al.

[11] Patent Number: 4,965,719
[45] Date of Patent: Oct. 23, 1990

[54] METHOD FOR LOCK MANAGEMENT, PAGE COHERENCY, AND ASYNCHRONOUS WRITING OF CHANGED PAGES TO SHARED EXTERNAL STORE IN A DISTRIBUTED COMPUTING SYSTEM

[75] Inventors: Kurt A. Shoens; Richard K. Treiber, both of San Jose, Calif.

[73] Assignee: International Business Machines Corporation, Armonk, N.Y.

[21] Appl. No.: 155,674

[22] Filed: Feb. 16, 1988

[51] Int. Cl.$^5$ ............ G06F 15/16; G06F 13/00; G06F 13/14
[52] U.S. Cl. ............ 364/200; 364/900; 364/962; 364/269; 364/228.1; 364/231.6; 364/230; 364/246.8; 364/281.3
[58] Field of Search ... 364/200 MS File, 900 MS File, 364/300

[56] References Cited

U.S. PATENT DOCUMENTS

| | | | |
|---|---|---|---|
| 4,207,609 | 6/1980 | Luiz et al. | 364/200 |
| 4,399,504 | 8/1983 | Obermarck et al. | 364/200 |
| 4,412,285 | 10/1983 | Neches et al. | 364/200 |
| 4,480,304 | 10/1984 | Carr et al. | 364/200 |
| 4,489,379 | 12/1984 | Lanier et al. | 364/200 |
| 4,531,185 | 7/1985 | Halpern et al. | 364/200 |
| 4,574,350 | 3/1986 | Starr | 364/200 |
| 4,584,643 | 4/1986 | Halpern et al. | 364/200 |
| 4,587,609 | 5/1986 | Boudreau et al. | 364/200 |
| 4,604,694 | 8/1986 | Hough | 364/200 |
| 4,665,484 | 5/1987 | Shinji Nanba | 364/200 |
| 4,716,528 | 12/1987 | Crus et al. | 364/300 |

OTHER PUBLICATIONS

Kung et al, On Optimistic Methods of Concurrency Control, ACM Trans. on Database Systems, vol. 6, No. 2, 6/81, pp. 213-226.
T. Haerder et al, Principles of Transaction-Oriented Database Recovery, vol. 15, Computing Surveys, No. 4, 12/83, pp. 287-317.
Integrated Concurrency and Shared Buffer Coherency Control for Multi-Systems, IBM TDB, vol. 28, No. 10, 3/86, pp. 4642-4650.

*Primary Examiner*—Michael R. Fleming
*Assistant Examiner*—Gopal C. Ray
*Attorney, Agent, or Firm*—R. Bruce Brodie; David A. Mims, Jr.

[57] ABSTRACT

A method for increasing throughput of N-way central electronic complexes concurrently executing processes to selectively lockable data resources while maintaining coherency among replicates of the information state of any accessed resource. Throughput is increased by overlapping a resource lock request with the processing incidental to accessing the resource. Processes are granted locks to portions of the resource based on the interest state held by the central electronic complex in the resource. Messages are attached to locked resources and are distributed to the appropriate complexes by virtue of a list maintained by the central electronic complex holding sole interest in the resource. The central electronic complex distributing the messages must receive acknowledgement of the message reception before releasing the resource.

4 Claims, 4 Drawing Sheets

METHOD FOR LOCK MANAGEMENT, PAGE COHERENCY, AND ASYNCHRONOUS WRITING OF CHANGED PAGES TO SHARED EXTERNAL STORE IN A DISTRIBUTED COMPUTING SYSTEM

FIELD OF THE INVENTION

This invention relates to an improvement in the methods of operating general purpose digital computing systems where one or more programs are executing at the same time. More specifically, the present invention relates to increasing throughput of concurrently executing processes to selectively lockable data resources, while maintaining coherency among replicates of the information state of any accessed resource.

DESCRIPTION OF THE RELATED ART

In high end data sharing systems, where many work units or subtasks have a need to share access to the same records, there is a need to manage concurrent access to the records/data, to insure that the lowest response times are achieved. Low response times lead to low multiprogramming level and reduced contention for other resources in the system. The need for proper management becomes even greater when the number of systems (complexes) sharing the data exceeds one. Database I/O's (Input/Output) constitute a significant source of delays in high end systems. The I/O delays arise from two major sources. First, there are delays associated with reading the blocks of data from the medium (Disk) on which it has been stored. Second, there are delays associated with informing other users when one system has modified (updated) the blocks of data (block invalidation) thereby invalidating the replicated copies.

One prior art approach for managing the sharing of data resources is described in the commonly assigned U.S. Pat. No. 4,399,504 by Obermarck, et al, entitled, "Method and Means For the Sharing of Data Resources in a Multiprocessing, Multiprogramming Environment". The approach, which is most efficient for two systems participating in data sharing, uses IBM Information Management System (IMS/VS) Version 1 in conjunction with an IMS/VS Resource Lock Manager (IRLM) to acquire and release locks on resources. When an IMS/VS process/user requests a lock of its IMS/VS Resource Lock Manager, the IMS/VS Resource Lock Manager sees if the request can be granted without communication If so, the request is processed immediately and the process/user is allowed to continue If communication is required, the request is queued for transmission and the process/user is suspended until the resource is released and the request can be resumed. The delays can range from 3 to 23 milliseconds for a pair of IBM 3084 systems. The approach permits a single updater and multiple concurrent readers. However, a process/user that updates a resource must make the update available to other systems in order to prevent them from using out of date versions of data. This requirement creates a number of problems which are more clearly shown by referring to FIG. 1. FIG. 1 represents a prior art simplified sequence of steps necessary to allow a process/user to update a record on a shared resource. The complex where the process/user resides, must first acquire a lock 100, and read the block containing the desired record from DASD into a buffer 102. The process/user then acquires its own lock 104 on the buffered block before it begins its updates. One problem occurs when the process/user must update multiple records in the same block.

For example if a several processes/users, as described above, had to update records in the same block, the Obermarck method would require that each process/user make its updates to the records in the block. Before each process/user can commit, the method requires that the updated block be written back to DASD 112, followed by a broadcast message 110 to other holders of the same block (replicates) indicating that the block has been changed. This sequence of events is repeated for each process/user updating the block.

The Obermarck method, which is used by IMS/VS, can be described as a "force at commit" scheme. As described, the scheme forces the updating complex to write the changed blocks to DASD, send out an invalidation message to the other complexes and wait for an acknowledgment before allowing a process/user to continue with further updates. For processes requiring multiple updates to the same block, the user must pay a typical minimum cost of 25 milliseconds average DASD access time for each DASD write.

The prior art method for managing buffer pools of a data sharing complex where a list is maintained of complexes holding copies of each block is described in the IBM Technical Bulletin by Dias, entitled, "Design and Analysis of Integrated Concurrency Controls" on page 4642 of Vol. 18, No 5, March 1986. A Dias' lock manager retains a list of complexes that hold a valid copy of the blocks in storage. The method requires that a process/user acquire a share lock on a block before it examines the block in the buffer pool. The lock manager will indicate whether the block buffered in storage is valid or not. If the block is found not to be valid, the Buffer manager will reread the block to insure that the most current level block is in the buffer pool. To update a block, a process/user must hold an exclusive lock on the block. At commit (update) time, it sends a request to the lock manager that removes all other systems from the "has valid copy" list and releases its exclusive lock. The method suffers from the fact that all locks require communication with other complexes. As a result, processes undergo extra delay for message passing and extra path length for suspend/resume. Another disadvantage is due to the fact that locking must be done at the block level, so that simultaneous reading and updating on the same block by a different process/user is not permitted, even if the processes are running in the same complex.

SUMMARY OF THE INVENTION

It is an object of the invention to control concurrent access to data resources by multiple users on the same and/or different central electronic complexes in an improved manner.

It is another object of the invention to increase throughput of concurrently executing processes to selectively lockable portions of data resources while maintaining coherency among replicates of the information state of the accessed resource.

It is yet another object of the invention to efficiently support record locking and buffer invalidation in N-way data sharing and to continue notification of resource change and adjustments to other processes holding locks in a transaction oriented environment.

It is still another object of the invention to service lock requests in overlap with processing of data being synchronized by the locks.

The foregoing and other objects, features, and advantages are accomplished by the method disclosed herein. Multiple users requiring access to a shared data resource (i.e. data block) are required to request either read or update locks on the resource. In general accordance with this invention, multiple users can have read access to the same block at the same time even though the block may be in the process of being updated by one of the users. However, only those users on the complex that hold an update lock on the block can update the block. More specifically, responsive to a given lock request, determination operations are initiated to establish the interest state (i.e. UPDATE or READ) in the resource of the complex where the requesting process/user resides. This determination operation is overlapped with operations required to access the resource and buffer the desired portion of the resource within a complex. Processing is then initiated to selectively grant or deny the lock request to the requesting user. If the processing results in the granting of an update lock, the complex attaches a message to the buffered resource and creates, maintains, and updates a list of other complexes requesting the buffered resource Updates to the buffered resource are reported to the resource lock manager who by using the updated list of complexes, broadcasts to each complex holding a replicate of the buffered resource notice of a change in the resource The complex buffering the resource, upon receiving acknowledgement of reception of the broadcasted messages, releases the locks on the portion of the data resource.

DETAILED DESCRIPTION OF THE EMBODIMENTS

The invention provides a method for operating a general purpose computer for sharing data resources while maintaining integrity and recoverability from failures, all with optimum utilization of computing resources such as storage, communication, and computing facilities.

Figure 1:
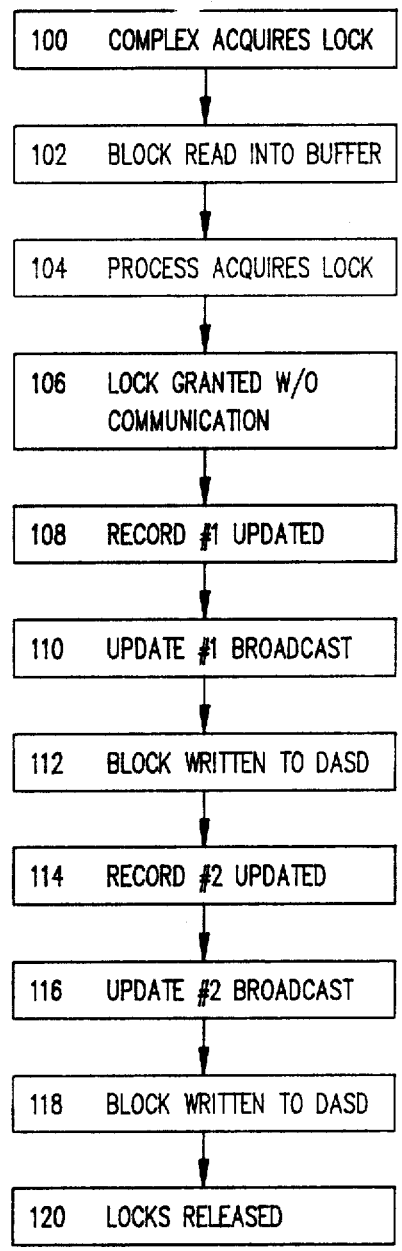
FIG. 1 illustrates a prior art approach for updating two records in a block by a process/user operating in a 2 way complex.
Figure 2:
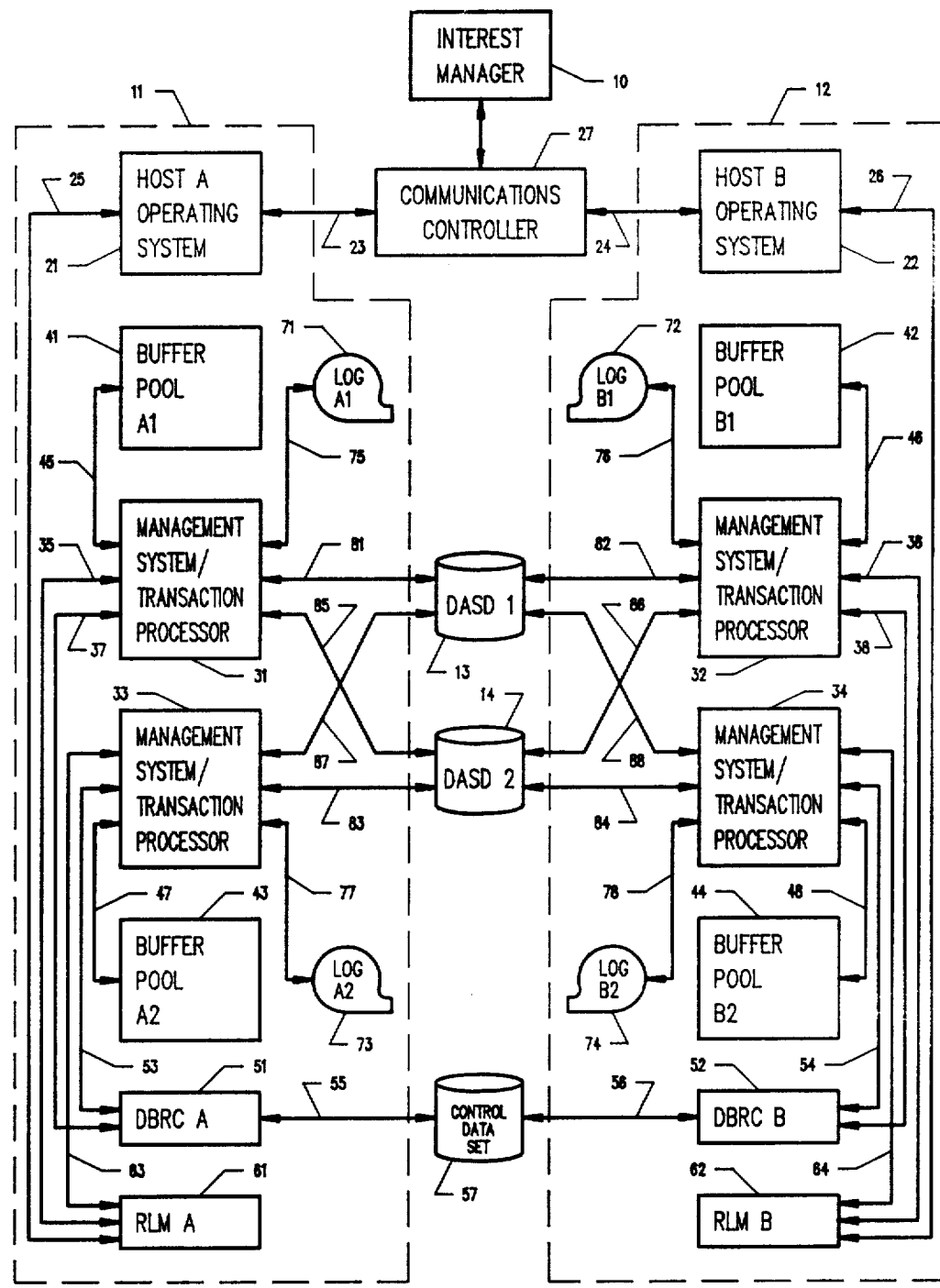
FIG. 2 is a block diagram representation of a typical digital computing system configuration for operations according to the invention.
Figure 3:
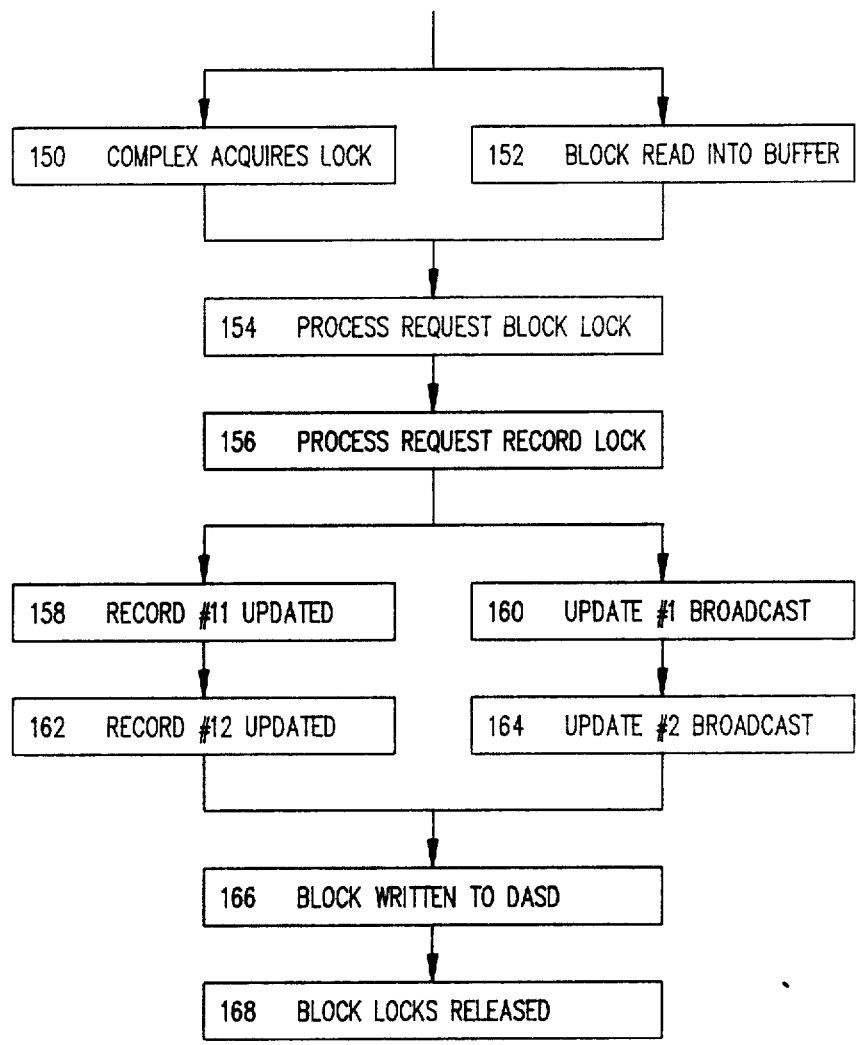
FIG. 3 illustrates the method employed by the invention in updating two records by a process/user operating in an N-way complex.

FIG. 2 is a representation of a typical system which may contain up to N - central electronic complexes (CEC's) 11, 12 (only two complexes are shown for simplicity) sharing access to data stored in Direct Access Storage Devices (DASD) 13, 14. Within each complex 11, 12 is a real or virtual address space, including a number of data storage and program areas, which include a host operating system 21, 22; one or more Management Systems/Transaction Processors 31-34; a buffer pool 41-44 for each Management System/Transaction Processor; a Data Base Recovery Control (Data base recovery control) system 51, 52; and a Resource Lock Manager (RLM) 61, 62.

Each Management System/Transaction Processor 31-34 is adapted for communication with one of transaction log disks 71-74. Complexes 11, 12 are interconnected by communication controllers (or alternatively, by a channel to channel adapter) and are loosely coupled through shared DASD's 13, 14 and control data set 57.

Each central electronic complex 11, 12 is comprised of a general purpose central processing unit — together with main storage and virtual storage devices, and the necessary channels and peripheral equipment, such as the IBM 3084 or IBM System/370, the architecture of which is described in U.S. Pat. No. 3,400,371 by G. M. Amdahl, et al, entitled, "Data Processing System".

Each complex 11, 12 operates under control of an operating system 21, 22 such as the IBM System/370 MVS Operating System. The Management Systems/Transaction Processors 31-34 execute under control of their respective operating systems and utilize these operating system facilities for interfacing communication controller 27, which may be, for example, an IBM 3705 Communication Controller.

Data base recovery control (DBRC) modules 51, 52 on each central electronic complex share a control data set 57, which may reside on a direct access storage device, such as an IBM 3350. An example of a Data base recovery control is the IBM IMS/VS Data Base Recovery Control Feature modified to operate a computing system according to the invention, described in the commonly assigned U.S. Pat. No. 4,480,304 by Carr, et al, entitled, "Method and Means for the Retention of Locks Access System, Subsystem, and Communication Failures in a Multiprocessing, Multiprogramming, Shared Data Environment".

Referring further to FIG. 2, the operation of a typical computing system, including two central electronic complexes 11, 12, will be described. Assuming that no failure conditions exist, one or more application programs (not shown) execute in a multiprogramming environment on each central electronic complex, each one under control of one of Management Systems/Transaction Processors 31-34.

When a process/user executing under Management System/Transaction Processor 31, for example, requires access to a portion of a data resource residing, for example, on DASD 13, Management System/Transaction Processor 31 will generate a lock request for communication to its counterpart resource lock manager 61, as is represented by control path 35. The lock request may consist of an UPDATE or SHARE lock request. An UPDATE lock is requested if the resource will be modified and a SHARE lock for a read.

In processing the lock request, resource lock manager 61 may communicate with resource lock manager 62 along the control/data path 25, 21, 23, 27, 24, 22, 26 through Interest Manager 10. The resource lock managers utilize an asynchronous locking scheme when requesting locks. This permits the system to overlap the response time delay associated with obtaining a lock with the delay that must be paid to read blocks from DASD 13. Using the asynchronous request scheme, resource lock manager 61 returns an immediate indication to the Management System/Transaction Processor 31 if interprocessor communication is required to resolve the lock request. The issuer of an asynchronous request, in this example Management System/Transaction Processor 31, is allowed to proceed and is informed by resource lock manager 61 when the lock request is completed whether it succeeded or failed. The Management System/Transaction Processor can therefore begin operations to physically read and buffer within the complex the portion of the desired resource needed. The conditions under which interprocessor communication is necessary or avoided will be more fully described hereafter, as will be the steps granting the locks. There is a single instance of an Interest Manager 10 in the complex. Each Resource Lock Manager 61, 62 establishes a communication session with the Interest Manager 10. The Interest Manager 10 mediates locks among the Resource Lock Managers 61, 62. Each Resource Lock Manager 61, 62 maintains a table of detailed lock information in virtual storage. The Interest Manager 10 also maintains its own lock table in virtual storage, and tracks lock ownership at the Resource Lock Manager level, rather than at the individual transaction level.

When a lock request requires sending a message to the Interest Manager 10, the Resource Lock Manager 61, 62 normally tells the requesting program to wait. When the request processing is complete, the Resource Lock Manager 61, 62 tells the requestor to resume. With asynchronous locks, the Resource Lock Manager 61, 62 tells the requestor when a message to the Interest Manager 10 is necessary and informs the requestor of the outcome when the response from the Interest Manager 10 returns.

The key aspect of implementing asynchronous lock requests is that the lock request processing must be done against the state of lock tables some time in the past. For example, if processor A acquires an update lock on an object at time T1 and releases it at time T2, then any lock request against that object that is made between time T1 and T2 must be rejected, even if the actual processing occurs after time T2.

In order to permit processing of lock requests after the fact, this scheme relies on an encoding of past locks held, called the lock history. The history is allowed to be inaccurate, as long as it is conservative (i.e., it may imply that more locks are held; it must not imply that less were held). With less accurate histories, less space overhead is incurred and simpler algorithms to test requests can be used. With more accurate histories, the likelihood of rejecting a request that should have been allowed is reduced. Since lock histories contain time steps that are compared among multiple processors, some sort of clock synchronization is required.

The asynchronous lock algorithm consists of three components; a synchronized logical clock, a means of encoding the past states of held locks, and a means of checking compatibility. These three topics are covered below.

A synchronized logical clock is used to maintain a coordinated notion of time. The clock is controlled by the Interest Manager. Each time a message is sent to a Resource Lock Manager, the Interest Manager increments the clock and stores the result in the message.

When a Resource Lock Manager receives a message from the Interest Manager, it compares the incoming clock value to its own clock. If the incoming value is larger, it is stored as the new clock value. The Resource Lock Manager does not alter its clock value in any other way.

As a result of this clock algorithm, the Interest Manager's clock is always at least as large as any Resource Lock Manager's clock. This property is crucial to the correctness of the asynchronous lock algorithm.

All history encoding is done in the Interest Manager. The method is that elements in the lock table are retained past the last UNLOCK operation against them. Periodically, old history elements in the lock table are deleted to bound the storage overhead. Some history information is also needed for active locks. Consider the case of a lock held in UPDATE mode that is downgraded to READ mode.

To represent history, each lock element contains two extra fields: the Interest Manager's logical clock value at the time of the last UNLOCK operation on the lock and the Resource Lock Manager ID that performed the last UNLOCK. These fields are declared as follows:

```
DECLARE
 1 LOCK,
  . . .
  2 LOCKTIME FIXED(32), /*Logical time of last UNLOCK */
  2 LOCKULID FIXED(8), /*RLM ID who last unlocked or 0 */
  . . .
```

When a new lock is created, LOCKTIME and LOCKULID are initialized to zero. When an UNLOCK is executed against a lock, the following algorithm is used. CLOCK is the Interest Manager's logical clock value and REQLMID is the unlocking Resource Lock Manager's unique ID.

```
if LOCKULID = REQLMID or LOCKTIME = 0 then
  LOCKULID = Lock Manager ID of UNLOCK'er;
else
  LOCKULID = 0;
LOCKTIME = CLOCK;
```

Note that LOCKULID is meaningful if only a single Resource Lock Manager has executed UNLOCK for this lock. Otherwise, LOCKULID is zero.

Periodically, a sweep of the lock table is performed to remove old history information. A threshold is chosen; history information older than the threshold is deleted. The logical clock value of the newest history information that has been deleted is retained for compatibility checking.

In the following , SWEEP is a global variable in the Interest Manager that contains the highest logical clock value of history information that has been deleted. SWEEP is used by the compatibility checking to guard against tardy requests. The sweep algorithm executed for each element in the lock table is:

```
if LOCKTIME not equal 0 and CLOCK - LOCKTIME greater
than THRESHOLD then do;
  SWEEP = max(SWEEP, LOCKTIME);
  LOCKTIME = 0;
  LOCKULID = 0;
  if no locks held on element then
  remove from lock table;
end;
```

In summary, the history information consists of:
The logical time of the last UNLOCK against every "recent" lock
The Resource Lock Manager ID that performed the last UNLOCK against a lock if there was only 1 such The SWEEP variable, which contains the most recent logical time of history information that has been discarded.

Each asynchronous lock request is stamped with the Resource Lock Manager's logical clock value at the time it is issued. At some point, perhaps after collecting several asynchronous requests, the Resource Lock Manager forwards the requests to the Interest Manager. The Interest Manager's compatibility check must make sure that:

The request is compatible with current holders of the lock

The request is compatible with the "known" history of the lock

The request is compatible with the deleted history of the lock

Note that only the time of the last UNLOCK is remembered for each lock. Thus, the algorithm must not permit any lock with a logical clock value less than or equal to the history time. However, if LOCKULID matches the Resource Lock Manager ID of the request, the lock can be allowed.

If the incoming request has a logical time less than or equal to SWEEP (the most recent discarded history), then the lock table does not contain the necessary information. In this case, the request is rejected.

These rules are summarized in the following code segment. REQTIME is the Resource Lock Manager's logical clock value when the request was submitted. REQLMID is the requestor's Resource Lock Manager ID. Both are fields in the message sent by the Resource Lock Manager to the Interest Manager.

```
if REQTIME less than or equal to SWEEP then
Reject request;
else do;
search for lock;
if found and ((REQTIME less than or equal to
LOCKTIME and REQLMID not equal LOCKULID) or
request incompatible with holders) then do;
Reject request:
else
Accept request
end;
```

The Interest Manager implements a POST MESSAGE (POSTMSG) operation. POSTMSG is an operation on a locked resource, whereby the updating Resource Lock Manager sends a message to every other holder of a lock on the same resource. In addition, the message is attached to the resource which is buffered by the Management System/Transaction Processor. The message informs any complexes currently holding a copy of the resource when a change has occurred. In addition, any complexes subsequently acquiring a lock on the buffered resource are informed that the curd rent version is not on DASD. If a message is posted to a buffered resource that already has a message attached, the existing message is discarded and the new message is attached. The new message is still sent to the other Resource Lock Managers holding locks on the resource. POSTMSG signals completion to its requestor, the Management System/Transaction Processor, when all involved complexes have acknowledged the message. In addition, the requestor receives a count of the number of other lock holders that received the message. The message exists in two complexes during its lifetime to insure availability in case of failures.

The Resource Lock Managers use a hierarchical locking scheme to grant locks. In hierarchical locking, the Management System/Transaction Processor organizes the lock names into a logical hierarchy. Therefore, before the Management System/Transaction Processor can acquire a lock, it must already hold the parent lock. The Resource Lock Managers on the various complexes communicate among themselves to keep track of which Resource Lock Managers hold locks (on behalf of local instances of the Management System/Transaction Processor) on which parts of the logical hierarchy. When a single Resource Lock Manager holds the only locks in a subtree of the hierarchy, that Resource Lock Manager has sole interest on the root lock of the subtree. The significance of sole interest is that the owning Resource Lock Manager can acquire locks within the sole interest subtree without communicating with any other Resource Lock Manager. At any one time, a Resource Lock Manager may have sole interest in many subtrees.

Processors in the data sharing complex each run a copy of the Resource Lock Manager code, which handles locally generated lock requests. The Resource Lock Managers, in turn, send messages to a single Interest Manager, located on some machine in the complex.

The database system arranges locks in a logical hierarchy. No lock can be acquired until its parent lock is held.

The Interest Manager dynamically tracks the set of Resource Lock Managers that hold locks on each resource. When a single Resource Lock Manager holds locks on a resource, that Resource Lock manager has sole interest in the resource. While a Resource Lock Manager has sole interest in a resource, it can acquire locks subsidiary to the resource without consulting with the Interest Manager.

The designer of the data base system chooses a lock hierarchy. The lock manager requires that a transaction acquire a lock on an object's parent before acquiring the lock on the object itself. Possible levels of the lock hierarchy for a data base system are:
Database
Relation
Page
Tuple
Block
Record The structuring of objects into a hierarchy does not imply that the data model supported by the data base system is hierarchical. The technique described here is equally applicable to relational systems.

Figure 4:
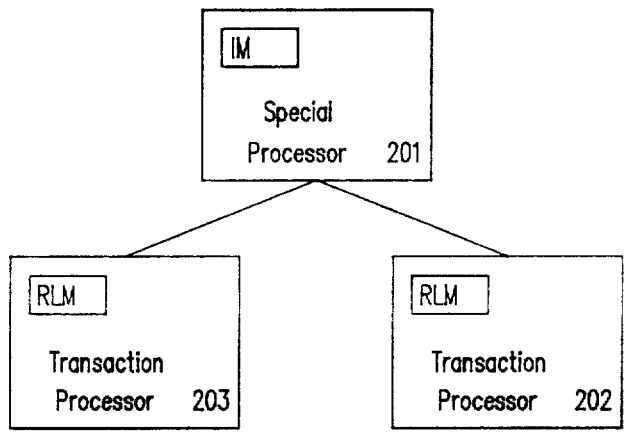
FIG. 4 is a block diagram representation of the structure of a hierarchical lock manager.

The structure of a hierarchical lock manager is shown in FIG. 4. A Resource Lock Manager (RLM) runs on each system that executes transactions. An Interest Manager (IM) runs on a separate system. Each RLM has a table in virtual storage that describes all the locks held on objects by transactions running on the same system. An RLM's table is organized as a tree of objects. In addition, each object has two queues associated with it: a queue of holders of locks on the object and a queue of waiters for locks on the object. When a RLM holds a lock on an object that no other RLM holds a lock on, the original RLM is said to have sole interest in the object. Due to the rule that a lock must be acquired on the parent object before a lock can be acquired on a child object, when an RLM has sole interest on an object, it also has sole interest on all descendants of the object. When a transaction needs to acquire a lock on an object, it submits the request to the RLM on its system. The RLM examines its lock table and does one of three things:
1. Grant the lock immediately.
2. Queue the lock request behind other incompatible requests for the same object.
3. Forward the request to the RLM via a message.

Figure 5:
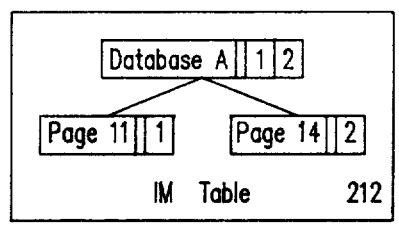
FIG. 5 is an example of tables maintained by the Interest Manager and Resource Lock Managers.
Figure 5:
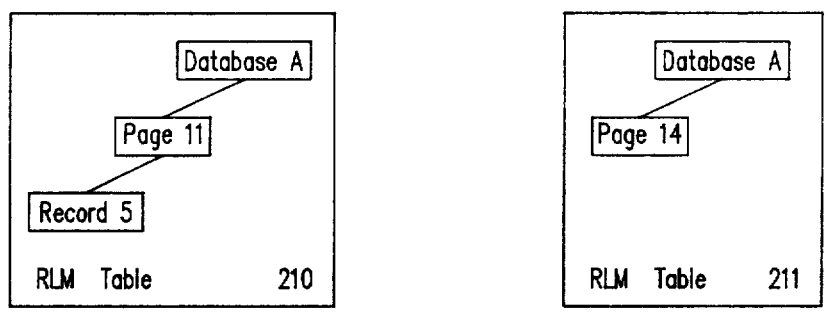

The IM has a table in virtual storage that describes locks held on objects by the various RLM's (on behalf of transactions on the systems). However, the IM's table does not contain all locks held in the complex. The table includes locks held on objects by more than one RLM and the highest level lock held on an object by an RLM with sole interest. Each IM table entry indicates the set of RLM's that hold the lock. FIG. 5 gives an example of the RLM and RLM tables.

When a transaction requests a lock on an object from the RLM on its system, one of three situations can exist:
1 The object is not in the RLM table.
2. The object is in the RLM's table but the RLM does not have sole interest in the object.
3. The RLM has sole interest in the object. We will examine the actions of the lock manager to these situations in turn.

If the object is not in the RLM table, the RLM enters the object into its table and puts the transaction on the queue of waiters for a lock on the object The RLM sends a message to the IM requesting the lock on the object and instructs the transaction to suspend.

One of three responses can come back from the IM, as described below. In what follows, the phrase "resumes the transaction" should be taken to mean that the transaction's entry on the waiter queue for the object is moved to the holder queue and the transaction is allowed to continue execution.

The IM responses and associated RLM actions are:
1. The lock on the object has been granted and the RLM has sole interest in the object. The RLM marks the object as sole interest and resumes the transaction.
2. The lock on the object has been granted, but another RLM has interest in the object. The RLM resumes the transaction.
3. The lock on the object cannot be granted due to the failure of another RLM. The transaction is awakened and notified that the request failed.

The object is removed from the RLM table.

If the object is in the RLM table but the RLM does not have sole interest in the object, the RLM appends the transaction's request to the waiter queue for the object, suspends the transaction, and forwards the request to the IM via message. The possible IM response message and associated RLM actions are nearly the same as for the previous case. The only difference is that when the IM grants the lock to the RLM, there may be other transactions, running on the same system as the request transaction, that hold locks on the object in conflict with the request. In that case, the requesting transaction remains queued behind the local transactions until they release their locks on the object.

If the RLM has sole interest in the object, no communication with the IM is necessary. As in the previous case, the transaction may remain on the waiter queue until other local transactions that hold conflicting locks on the object release their locks.

The IM maintains a table of the objects that are locked by some RLM but not covered by sole interest. When a lock request is received from a RLM (say, RLM 61), the IM checks its table for the object. If the object was not already, present in the table, it is entered into the table, marked as sole interest for RLM, and a response is returned to RLM 61 granting the lock and given RLM 61 sole interest.

If the object was already in the IM's tables, the IM sends a message to each of the other RLM's that hold a lock on the object in conflict with the request. RLM 61 is added to the list of RLMs that hold locks on the object. When all of the RLMs return messages indicating that they give permission to grant the new lock, the IM sends a message to RLM 61 granting the lock.

If, at the time of the request, another RLM (say, RLM 62) has sole interest in the object, a more complex protocol is needed. While the IM immediately adds RLM 61 lock to the object, the sole interest held by RLM 62 is retained temporarily. During that time, the IM requests that RLM 62 send the IM any locks held on objects directly below the sole interest object. The new objects are, of course, sole interest to RLM 62. When all directly subsidiary locks have been forwarded to the IM by RLM 62, RLM2's sole interest in the original object is dropped.

If any of the RLM's that hold conflicting locks on the object have failed, then the IM returns an error response to the lock request to RLM 61.

The RLM must respond to both local transaction requests and to remote requests from the IM. This section describes the responses to IM messages. When an RLM receives a remote request from the IM, it checks its table for the object involved. If its table does not contain the object, a message granting the lock is returned to the IM immediately. If its table does contain the object, the request is checked for compatibility against the current holders and waiters for the lock. If the request is compatible, the lock granting message is returned to the IM immediately. Otherwise, the request is queued behind any other waiting lock requests for the object. When the request can be granted (due to other transactions releasing locks on the object), a message is returned to the IM granting the lock.

When a transaction releases a lock on an object, the RLM examines the queue of waiters to see if any new holders can be accommodated. If so, as many new waiters as are compatible are added to the holder queue, if they are local. Compatible waiters that are remote cause a message to be sent to the IM granting the request. When the last lock on an object is released on an RLM, a message is sent to the IM to release the lock.

The IM removes the RLM from the list of lock holders for the object. If only one RLM now holds locks on the object, a message is sent to it giving it sole interest and the IM deletes all objects beneath the now sole-interest object in its table.

Once the lock is granted by Resource Lock Manager 61 to the Management System/Transaction Processor 31, it accesses the desired data in DASD 13 over line 81, and reads the data into its buffer pool 41. At some time during or after the processing of the data by the process/user, the data is written back out to DASD 13 and Resource Lock Manager 61 notified to release the locks. If the process/user must make multiple updates to the data held in buffer pool 41, Management System/Transaction Processor 31 holds the data in the buffer pool until all updates are completed before writing the updated data out to DASD 13. If Resource Lock Manager 62 request a copy of the resource before the data is written to DASD 13, Resource Lock Manager 61 will deliver a copy directly from the buffer pool over control path 45, 31, 35, 61, 25, 21, 23, 27, 24, 22, 26. The Management System/Transaction Processor 31 returns the following information for any updated blocks to the Resource Lock Manager 61 for use in the POSTMSG operation.

ID of the updating system
ID of the updated database
ID of the updated block

In a similar manner, any of the other Management Systems 32-34 cooperate with their counterpart resource lock manager's 61, 62 to access data on DASD's 13, 14 and operate on the data stored in buffer pools 41-44. Ensuring that updates made in one buffer pool are properly accounted for in the buffer pools of other complexes that may have a copy of the same block is referred to as maintaining coherency.

Each Management System/Transaction Processor maintains a log of all transactions (processes) on disks 71-74, for recovery in the event of a failure. Data base recovery control facilities 51, 52 share access to control data set 57, and cooperate with Management Systems 31-34 to control the recovery of a data base in the event of a system or other failure.

Referring now to TABLE 1, a description of the Buffer manager module contained within each Management System/Transaction Processor 31-34 will be given, defining the protocol used in operating the computing system according to the method of the invention. The Buffer Manager module is specifically designated to communicate with the appropriate Resource Lock Manager for lock acquisition.

The Buffer Manager maintains a pool of blocks in main storage (21) when the Management system is a Data Base Management System/Transaction Processor or in the buffer pool if an Information Management System/Transaction Processor (41). Each block has a buffer header associated with it that contains the identity of the block (what data base and what block number) and other status. The other status that the buffer manager keeps with each block is given in Table 1.

The Buffer Manager holds either an UPDATE or a READ lock on each block that it holds. READ and UPDATE locks are compatible; UPDATE locks are incompatible with other UPDATE locks. Therefore, only one processor can hold an updatable copy of a particular block at any time but multiple readers are allowed. Before the Buffer manager can allow a process/user to modify a block, the Resource Lock Manager must hold an UPDATE lock on the block. It should be noted that the processes also acquire record locks which serve to guarantee consistency hierarchically beneath the related block lock. When the Buffer manager fetches a block from DASD, it:

1. Clears BUFSYNC in the buffer header
2. Sets BUFEVENT to 2
3. Requests a SHARE LOCK on the block with the asynchronous option
4. Schedules the DASD read
5. Waits on the BUFSYNC flag When the lock request processing is complete, the Resource Lock Manager drives the lock status exit of the requesting subsystem. The lock status exit sets BUFFLFAI if the lock request failed. In any event, it decrements BUFEVENT. If BUFEVENT falls to zero, it signals the BUFSYNC event.

Similarly, when the I/O is complete, BUFFIOER is set if an I/O error occurred while reading the block. In any event BUFEVENT is decremented. If BUFEVENT falls to zero, the BUFSYNC is signaled.

If the lock request succeeded and there was no error reading the block, the block can be used directly. If either error occurred, the block that was read cannot be used. In the event of a lock request failure, a synchronous lock request is used to guarantee success on the second attempt, followed by a normal block read.

If a process/user holding a SHARE lock on a block must later update the block, then a synchronous lock request must be made to upgrade the share lock on the block to update. If the intention to update the block is known in advance, then the block lock acquired asynchronously in the above process can be acquired in UPDATE mode, avoiding the extra lock request and probable suspend/resume. The BUFFUPDT field in the buffer header described above is used to remember that an UPDATE lock is held on the block.

OPERATION OF THE INVENTION

CASE I

With reference to the Figures and Table 1, a no contention operation using the inventions will next be described. Assume that block B1, consisting of records R11 & R12, is on DASD 13 and is not resident in the buffer pools 41 or 43. Assume that a process/user in central electronic complex 11 wishes to access R11.

STEP 1: The process/user requests B1 from Buffer Manager

STEP 2: Buffer Manager sees that B1 is not in Buffer Pool and initiates the following actions:
An Asynchronous Update Lock request is issued for B1
An I/O is begun to read B1 into the buffer
The process/user is suspended STEP 3: The Asynchronous Update Lock request response is returned indicating success and sole interest
The Buffer Manager notes Lock request success in its table 150

STEP 4: The I/O reading B1 completes
Buffer Manager notes successful completion in table, 152
B1 is marked as usable in Buffer Pool by Buffer Manager and a message is attached indicating complex 11 has sole interest
Process/user resumes STEP 5: Process/user requests its own Read block lock on B1, 154
The request is granted w/o communication STEP 6: Process/user request a lock on R11 and R12, 156
Lock hierarchically subordinated to block lock
Lock granted immediately w/o communication due to sole interest on B1

STEP 7: Process/user updates R11, 158

STEP 8: Process/user enters phase 1 of commit

STEP 9: Buffer manager issues POSTMSG against B1 160

STEP 10: Process/user updates R12, 162

STEP 11: Buffer manager issues POSTMSG against B1 162

STEP 12: Process/user waits for Buffer Manager to signal that POSTMSG calls done in STEP 9 and STEP 11 are completed STEP 13: Process/user locks released STEP 14: Buffer Manager decides to write the updated block back to DASD STEP 15: Block write to DASD complete 166
STEP 16: Buffer Manager issues request to Resource Lock Manager to clear the messages for the block & release the block lock 168.

CASE II

Assume that block B1, consisting of records R11 & R12, is in the buffer pool 41 of complex 11 after the block has been updated but before it has been written to DASD 13 (STEP of CASE I). Assume that a process/user on complex 12 wishes to read R11.
STEP 1: The process/user on complex 12 requests B1 from Buffer Manager
STEP 2: Buffer Manager sees that B1 is not in the Buffer Pool 42 on complex 12 and initiates the following actions:
  An Asynchronous SHARE lock request is issued for B1
  An I/O is begun to read B1 into storage The process/user is suspended
STEP 3: The Asynchronous Lock request response is returned indicating success and no sole interest, and POSTMSG message
  complex 12's Buffer Manager notes Lock request success in its table
  Message returned from complex 11's Resource Lock Manager 61 as a result of the prior POSTMSG broadcast (STEP 11 of CASE I) indicating complex 11 still holds current B1 block
  Message sent to complex 11 requesting block B1 by complex 12
STEP 4: The block I/O reading B1 completes
  Buffer Manager on complex 12 notes successful completion in table
  B1 is marked as unusable in Buffer Pool by Buffer Manager
STEP 5: The current copy of block B1 is received from complex 11
  Process/user resumes
STEP 6: Process/user requests its own lock on B1
  Request is for a share lock
  The request is granted w/o communication
STEP 7: Process/user requests a lock on R11
  Lock hierarchically subordinated to block lock
  Record lock requires communication, since B1 is not sole interest on complex 12
  Process/user suspended until the lock request is granted for R11

CASE III

Assume that block B1, consisting of records R11 & R12, is already in the buffer pool 41 of complex 11, and that a process/user on complex 11 wishes to access R11.
STEP 1: The process/user on complex 11 requests B1 from Buffer Manager
STEP 2: Buffer Manager sees that B1 is in the Buffer Pool 41 on complex 11 and returns to the process/user immediately
STEP 3: Process/user requests its own read lock on B1
  The request is granted w/o communication
STEP 4: Process/user requests a lock on R11
  Lock hierarchically subordinated to block lock
  Record lock requires no cOmmunication, since B1 is sole interest on complex 11
Let R be the number of records accessed by a transaction, B the number of blocks read by a transaction, U the number of blocks updated by a transaction, and N be the number of complexes participating in data sharing.

Assume that the database system does not predict whether a block will be updated when the block is read from DASD. Then, assuming no contention, this invention will require the following number of suspend/resume's [S/R]and messages to run a transaction:

$$SR = B + U$$
$$\text{Messages} = B + U + 1$$

A suspend/resume is caused by the need to wait for each block to be read and for each block lock to be upgraded to UPDATE mode. A message is sent for each block read and updated, plus an UNLOCK ALL and buffer invalidation message at the end.

For current IMS/VS data sharing, the cost are:

$$SR = B + U + R$$
$$\text{Messages} = U(N - 1) + R + 1$$

The $U(N - 1)$ term is the cost of doing broadcast invalidation. The R term counts the messages to acquire record locks. Some transactions may require fewer than R messages, if some of the records hash to the same GHT class. Comparing these figures, the invention requires R fewer suspend/resume's and at least $R - B + U(N - 2)$ fewer messages. For 2 way sharing, there are $R - B$ fewer messages with the invention. For a transaction that reads 6 records on 4 blocks and updates 2 of the records on 2 blocks. Counting both messages and suspend/resume pairs for the current IMS/VS scheme doing 2 way data sharing, we get:

| ACTION | MESSAGES IMS/VS | MESSAGES INVENTION | S/R IMS/VS | S/R INVENTION |
|---|---|---|---|---|
| READ 4 BLOCKS | 0 | 4 | 4 | 4 |
| GET 6 RECORD LOCKS | 4 | 0 | 4 | 0 |
| BUFFER NOTIFY | 2 | 0 | 0 | 0 |
| UNLOCK ALL | 1 | 1 | 0 | 0 |
| TOTALS | 7 | 5 | 8 | 4 |

Note that only 4 messages are charged to the IMS/VS scheme for getting 6 locks. The assumption is that for locks on the same block, the global hash table scheme in the IMS/VS Resource Lock Manager will save the communication. Also in both schemes only 1 message is being charged for UNLOCK ALL, which assumes an optimization that may not be in place today. For the cited example, the invention sends more messages for buffer invalidation, but in fact saves them on the record locks. The more important factor is that the extra suspend/resumes pairs needed by current IMS/VS are eliminated in the new scheme.

When a complex in the system fails, it may be holding blocks that have committed updates in them that have not been written back to DASD. The Buffer Manager, Resource Lock Manager, and the Data base recovery control must cooperate to make sure that no transaction on a surviving complex sees stale data and that the latest values are restored quickly. The Resource Lock Manager retains copies of POSTMSG in at least two complexes. Therefore, no single failure will cause a loss of POSTMSG messages. These retained messages prevent surviving complexes from viewing stale data. When a complex fails, a surviving complex takes responsibility for recovering from the failure. This complex creates a surrogate for the failed Buffer Manager that answers request for block values lost in the crash. The surrogate holds requests from other complexes until recovery is complete and the current block values have been written back to DASD. The Data base recovery control uses single system redo type recovery to recover the values of lost blocks. Current techniques, such as checkpointing, can be used to limit the amount of log data that must be examined to perform recovery. Note that the recovered blocks may contain uncommitted updates from surviving complexes. The uncommitted record values are covered by record locks still held by the surviving complexes. When recovery for the failed complex is complete, the block locks (and the record locks held by uncommitted transactions on the failed complex) are released. All messages attached to block locks by the failed complex are also deleted.

While the invention has been described with respect to a preferred embodiment thereof, it will be understood by those skilled in the art that various changes in detail may be made therein without departing from the spirit, scope, and teaching of the invention. Accordingly, the herein disclosed invention is to be limited only as specified in the following claims.

We claim:

1. A method for managing the grant and release of locks requested by in-flight processes defined over multiple processors and associated shared external page storage and for maintaining coherency among copies of the same page, each processor including an internal memory, an operating system, and a lock manager, processes executing on respective processors generating read and write operations (ops), and said ops being presented to the local lock manager for obtaining either shared read locks or an update write lock to a designated page, said pages being either resident in processor internal memory or being copied into processor internal memory from the shared external storage, said local lock manager notifying other processor lock managers of the change in lock and page status, comprising the steps of:
   (a) responsive to a write ops generated by a process executing on a first processor,
     (1) obtaining an update lock on a page designated by said write ops from the first processor lock manager, updating the designated page in the first processor internal memory, notifying all other lock managers by way of a message of the identity of the first processor and the updated page;
     (2) responsive to notification acknowledgements received by the first processor from the other processor lock managers releasing the update lock, and the asynchronous writing of the updated page to external store; and
   (b) responsive to a read ops generated by a process executing either on the first or on a second processor,
     (3) obtaining a share lock from a page designated by the read ops from the counterpart first or second processor lock manager, ascertaining from any message accompanying the lock grant whether the page designated by said read ops is located in the internal memory of any processor; and
     (4) either copying the designated page from the internal memory from the processor identified in the message or copying from shared external storage.

2. The method according to claim 1, wherein the asynchronous writing of the updated page to external store includes writing of the page asynchronous to the process generating the original write or update ops, said asynchronous writing to external store further includes batch writing of multiple updated pages.

3. The method according to claim 1, wherein the notification of lock status and message passing among processors and their local lock managers utilizes the shared external store as a mail-drop type communications path.

4. A method for managing the grant and release of locks requested by in-flight processes defined over multiple processors and associated shared external page storage and for maintaining coherency among copies of the same page, each processor including an operating system, a lock manager, and means accessing external storage and for communicatively coupling other processors, each processor being responsive to its local process generated read and write ops for establishing a lockable path to said pages utilizing the lock manager, said pages being either resident in processor internal memory or as copied into processor internal memory from the shared external storage, said lock manager notifying other processor lock managers of any change in lock and page status, locks being granted to a page on either an update write or shared read basis, comprising the steps of:
   (a) requesting either a shared or update lock on a page by a process to the local lock manager;
   (b) either granting or denying the lock, or, altering the exclusivity of any subsisting lock on the page previously granted to the requesting process by the local lock manager, said lock grant or denial being processed in overlap with establishing an access path to the page;
   (c) responsive to grant of a lock, the requesting process executing the steps of:
     (1) utilizing the page, and
     (2) reporting alteration in the information state to the local lock manager (NOTIFY step); and
   (d) in the event of alteration, the local lock manager executing the steps of:
     (1) notifying all lock managers of non-coherency between the updated page and prior versions thereof by appending a message to the notification identifying the updated page and the processor holding the update page in its internal memory; and
     (2) upon acknowledgement from the lock managers of all the notified processors, either releasing the update page lock or making the page lock shared;
   (e) copying the updated page from the identified processor by processes holding shared locks on the page.

* * * * *

UNITED STATES PATENT AND TRADEMARK OFFICE
CERTIFICATE OF CORRECTION

PATENT NO. : 4,965,719

DATED : October 23, 1990

INVENTOR(S) : K. A. Shoens and R. K. Treiber

It is certified that error appears in the above-identified patent and that said Letters Patent is hereby corrected as shown below:

```
In column 2, line 5, delete "a".
In column 4, line 35, delete "Access", insert --across--
In column 7, line 56, delete "curd rent", insert --current--
In column 9, line 7, delete "RLM", insert --IM--
In column 9, line 27, delete "object", insert --object.--
In column 10, line 1, after "already", delete --,--
In column 10, line 54, delete "Once the lock is granted by Resource Lock
Manager 61 to" insert --In parallel with the processing of the lock request,--
In column 10, line 56, after "31", delete --, it--
In column 10, line 61, delete "process/user must", insert --processes/users
in CEC If--
In column 10, line 63, after "31", insert --may--
In column 10, line 63, delete "holds", insert --hold--
In column 10, line 66, delete "request", insert --requests--
In column 12, line 28, delete "access", insert --update--
In column 13, lines 19 & 20 should read:
                        An I/O is begun to read B1 into storage.
                        The process/user is suspended In column 13, line 63, delete "cOmmunication", insert --communication--
```

Signed and Sealed this

Twenty-eighth Day of April, 1992

*Attest:*

HARRY F. MANBECK, JR.

*Attesting Officer*   Commissioner of Patents and Trademarks